Patented Apr. 11, 1950

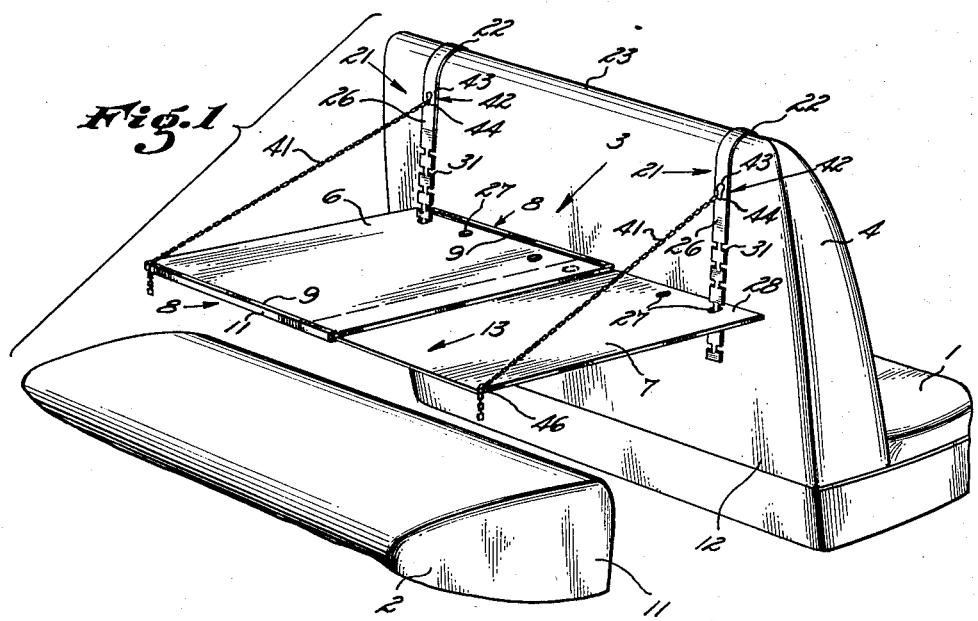
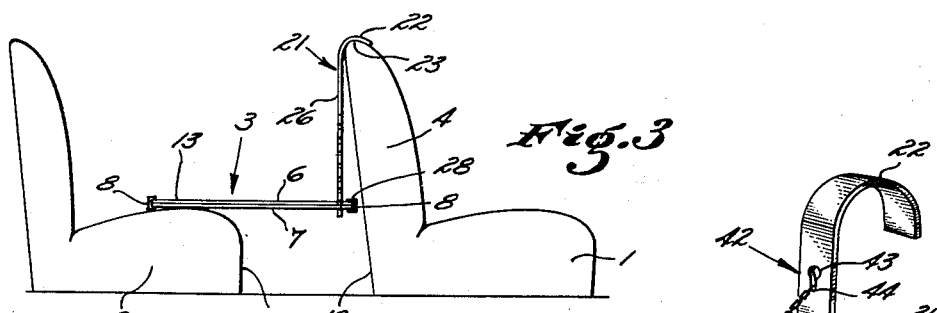
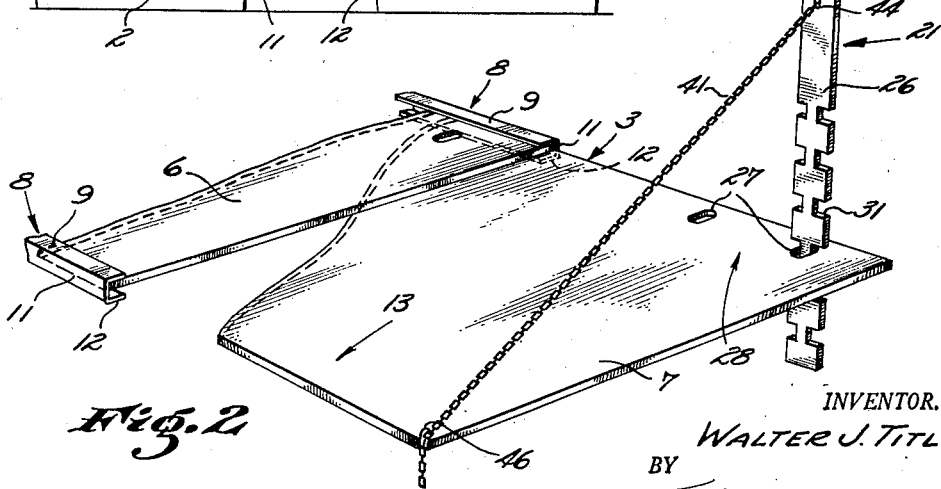
INVENTOR.
WALTER J. TITLEY
BY
ATTORNEY

2,503,602

UNITED STATES PATENT OFFICE 2,503,602

PLATFORM FOR CONVERTING THE AFTER COMPARTMENT OF AN AUTOMOBILE

Walter J. Titley, Santa Monica, Calif.

Application November 17, 1947, Serial No. 786,456

10 Claims. (Cl. 5—94)

This invention relates to automobile accessories, and has for an object the provision of an apparatus whereby the after compartment of an automobile having both a front and a rear seat can be converted into a safe enclosure within which a child can play or sleep either while the automobile is stationary or traveling.

Another object is so to design the apparatus, and so to associate it with the automobile's seats and side walls, that the enclosure formed thereby is amply large to accommodate more than one child.

A further object of my invention is to provide an enclosure-defining accessory of the character described which is laterally collapsible so that it can leave an ample amount of space available and unobstructed on the rear seat of the automobile to accommodate one or more persons in a normal and comfortable sitting position and still serve to carry a child safely while traveling, or, at the option of the car's occupants, which can be extended to utilize the car's entire width and thereby provide an enclosure for one or more children within which they can sleep or play safely not a great deal smaller than a standard child's "play pen" of the stationary type.

It is another object of my present invention to provide an enclosure-defining accessory of the general type indicated which is capable of adjustment to an elevation above that which it assumes when serving as a "play pen" and high enough to afford ample leg room for one or more passengers occupying the car's rear seat, so that the device is readily convertible into a substantially horizontal platform upon which the car's occupants can write, play games, serve meals, or otherwise derive the benefits afforded by a more conventional table or desk.

Yet another object is to provide an accessory in the form of a convertible and adjustable platform as described, which is capable of being mounted in operative position within a standard automobile and removed therefrom easily and quickly and without altering or damaging the vehicle in any way.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings:

Figure 1 is a perspective view showing portions of the front and rear seats of an automobile and showing the manner in which a convertible platform incorporating the principles of the present invention is mounted in such a way as to provide a desk or table for the convenience of passengers occupying the rear seat.

Figure 2 is a perspective view drawn to a more highly enlarged scale, of the platform of Figure 1, apart from the automobile, portions of the figure being broken away the better to reveal the platform's constructional detail.

Figure 3 is a view in side elevation, drawn to reduced scale, showing the manner in which the apparatus is installed in order to provide a safety enclosure or "play pen" for the use of one or more children.

In the drawings, Figures 1 and 2, respectively, indicate the front and rear seats of a conventional automobile of the sedan or five-passenger coupé type; and the reference numeral 3 indicates a platform incorporting the principles of the present invention operably installed upon the back 4 of the front seat 1 in such a manner as to provide a table, desk, or the like, for the convenience of occupants of the rear seat 2.

The platform 3 is laterally collapsible and extensible so that it can optionally extend throughout the entire width of the automobile, or be collapsed so as to extend throughout substantially one half of the car's width, thereby further widening the range of the utility of the apparatus, as will be apparent as the description progresses.

In order to make possible the lateral extension and collapsing of the device, it comprises a plurality, preferably a pair of sections 6 and 7, telescopically interengaged through the expedient of rails 8 rigidly secured to the front and rear edges of one of the sections, say the section 6, and between which the front and rear edges of the other section 7 are slidably engaged. Each of the rails 8 preferably comprises a strip of metal or other suitable rigid material, and of U-shaped or channel cross section. Each rail 8 is secured to the associated edge of the platform section 7 with one flange 9 engaging the upper surface of that section; and, since the web 11 of the channel 8 is wider than the total thickness of both sections 6 and 7, the opposing flange 12 is thereby spaced below the lower surface of the section 6, but a distance great enough for the slidable reception of the other section 6 between the flange 12 and the under surface of the section 7.

In the event that but two sections 6 and 7 comprise the platform 3, it is preferred that these two sections correspond to each other in width, with the result that the section 7 can be superimposed directly upon the lower section 6 and thereby yield a structure of minimum width. However, by sliding the section 7 laterally with respect to the section 6, the platform can be extended to nearly double its collapsed width and therefore made to assume any desired width greater than its collapsed width and up to substantially the full width of the car's interior, as determined by the number of occupants of the rear seat desiring to use the work surface provided by the platform, as well as by the particular use to which it is to be put.

In length, i. e., in distance measured between the flanged edges, the platform is materially greater than the distance between the front edge 11 of the rear seat 2 and the after surface 12 of the back 4 of the front seat 1, as is most clearly shown in Figure 3. Consequently, when supported in elevated position, i. e., as illustrated in Figure 1, where the device is to be employed as a desk, table, or the like, the after edge 13 of the platform 3 extends over the rear seat 2 and consequently over the laps of the persons occupying the rear seat.

The means for supporting the platform 3 in this position comprises a plurality, preferably a pair, of hangers 21, preferably each of which is in the form of a flat strip of metal reversely curved at its upper end to provide a hook 22 proportioned to be releasably received upon the top edge 23 of the back 4 of the front seat. From the hook portion 22, a shank 26 extends downwards, at least to an elevation slightly below that of the upper surface of the rear seat 2, as best shown in Figure 3, so that each of the shanks 26 can extend through a hole 27, a plurality of which is provided in the platform 3 adjacent its front edge 28. Each of these holes 27 is elongated in a direction perpendicular to the plane of the strip which constitutes the shank 26 of the associated hanger 21, i. e., since the plane of each of the shanks 26 extends transversely with respect to the automobile, each of the holes 27 is elongated fore and aft. Moreover, the length of each hole 27 is slightly greater than the width of the shank 26, whereas the width of each hole 27 is so much narrower than the shank 26 that the shank can be turned so that its plane extends transversely only when the side edges of the hole 27 through which the shank extends are in register with two opposed notches 31, a plurality of pairs of which are provided throughout a substantial portion of the length of each shank 26.

Because of this arrangement, it is possible to support the forward edge 28 of the platform 3 upon the shanks 26 of the hangers 21 and in any selected elevation by first raising the hanger 21 until its hook 22 is released from the back 4 of the seat and then turning the hanger 21 until the width of the shank 26 extends longitudinally of the associated hole 27. This permits the shank 26 to move freely longitudinally through the hole until the selected pair of notches 31 register with the plane of the platform whereupon, by turning the hanger 21 back to its original position, the side edges of that hole are caused to enter the selected notches and thereby firmly engage the platform with the hanger, as most clearly shown in Figure 2.

The holes 27, of course, are provided in both sections 6 and 7 of the platform and are so spaced along the upward edges of the sections that they register with each other when the two sections 6 and 7 are disposed in superimposed relation. Moreover, this permits the hanger 21 to be engaged with the platform in supporting relation thereto, either when the platform is fully collapsed or in any selected degree of lateral extension.

When the platform is employed as a desk or table, as illustrated in Figures 1 and 2, the after edge 13 thereof is supported far enough above the rear seat 2 to afford ample leg room, this being accomplished by a tension member 41 associated with each of the hangers 21. Each of these tension members 41 preferably comprises a chain releasably engageable adjacent its upper end within a keyhole-shaped opening 42 adjacent the upper end of the associated hanger 21. The enlarged upper end 43 of the keyhole-shaped opening is large enough to permit the chain to pass freely therethrough, whereas the relatively narrow lower portion 44 is adapted to receive one of the links therein, with that link disposed in a vertical plane, thus holding the next adjacent link behind the hanger in a substantially horizontal plane and therefore so engaged by the side edges of the narrower portion 44 that it is securely fastened to the hanger and hence capable of resisting any tendency for the chain 41 to be withdrawn from the opening.

The lower end of the chain 41 is similarly releasably engaged within a notch 46 formed in the platform 3 adjacent its after edge 13. Thus it may be seen that the after edge of the platform 3 may be supported firmly and at any selected elevation, thereby permitting the platform to be used either while extending horizontally or at any selected angularity with respect to the horizontal within the limits of the apparatus.

When it is desired to employ the apparatus of the present invention as a means for converting the after compartment of the automobile into a safe enclosure for one or more children, the chain supports 41 may be removed and the hangers 21 so adjusted with respect to the platform that its forward edge 28 thereof will be supported thereby and at substantially the same elevation as that portion of the rear seat 2 upon which the platform's after edge 13 rests, as clearly shown in Figure 3. When so arranged, the apparatus forms a convenient, dependable, and adequately safe enclosure within which one or more children may play or sleep, either while the automobile is stationary or while traveling. Furthermore, by collapsing the platform so that it occupies less than the full width of the automobile, one or more persons may be accommodated in a natural and comfortable sitting position. The platform still provides an adequate "play pen" or crib for at least one child.

I claim:

1. A platform structure for an automobile having front and back seats, comprising a plurality of hangers, each of said hangers comprising a hook portion engageable with the back of said front seat and a shank extending downward therefrom aft of said seat back, a platform comprising a plurality of sections and means slidably interconnecting said sections for telescopic relation to each other, said sections having a plurality of holes therethrough adjacent their forward edges and in position to register with each other when said sections are in superimposed relation whereby said shanks of said hangers are adapted to extend through at least two spaced pairs of aligned holes when said platform is collapsed and, optionally, through single holes adjacent the ends of said platform when said platform is extended, means for releasably supporting the forward edge of said platform on said shanks optionally at any of a plurality of elevations, said platform extending aft from said hangers far enough for its after portion to rest upon said back seat when said forward edge is secured to said shanks at a predetermined one of several optional elevations, and means for supporting said after portion of said platform with said after portion elevated above said back seat.

2. A platform structure for an automobile having front and back seats, comprising a plurality of hangers, each of said hangers comprising a hook portion releasably engageable with the back of said front seat and a shank extending downward therefrom aft of said seat back, and a platform having a plurality of holes therethrough adjacent the forward edge thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having opposed notches in its lateral edges adapted to receive the side edges of one of said holes and thereby releasably support the forward edge of said platform.

3. A platform structure for an automobile having front and back seats, comprising a plurality of hangers, each of said hangers comprising a hook portion releasably engageable with the back of said front seat and a shank extending downward therefrom aft of said seat back, and a platform having a plurality of holes therethrough adjacent the forward edge thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having a plurality of pairs of opposed notches in its lateral edges, the side edges of each of said holes in said platform being selectively receivable within the notches of any of said pairs of notches of one of said shanks whereby the forward edge of said platform is releasably supported optionally at selected elevation upon said hangers.

4. A platform structure for an automobile having front and back seats, comprising a plurality of hangers, each of said hangers comprising a hook portion releasably engageable with the back of said front seat and a shank extending downward therefrom aft of said seat back, a platform having a plurality of holes therethrough adjacent the forward edge thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having a plurality of pairs of opposed notches in its lateral edges, the side edges of each of said holes in said platform being selectively receivable within the notches of any of said pairs of notches of one of said shanks whereby the forward edge of said platform is releasably supported optionally at selected elevation upon said hangers, and means for releasably supporting the after edge of said platform at selected elevation.

5. A platform structure for an automobile having front and back seats, comprising a plurality of hangers, each of said hangers comprising a hook portion releasably engageable with the back of said front seat and a shank extending downward therefrom aft of said seat back, a platform having a plurality of holes therethrough adjacent the forward edge thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having a plurality of pairs of opposed notches in its lateral edges, the side edges of each of said holes in said platform being selectively receivable within the notches of any of said pairs of notches of one of said shanks whereby the forward edge of said platform is releasably supported optionally at selected elevation upon said hangers, and means for releasably supporting the after edge of said platform with said platform extending aft from said back of said front seat at selected angularity.

6. A platform structure for an automobile having front and back seats, comprising a plurality of hangers, each of said hangers comprising a hook portion releasably engageable with the back of said front seat and a shank extending downward therefrom aft of said seat back, and a platform having a plurality of holes therethrough adjacent the forward edge thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having a plurality of pairs of opposed notches in its lateral edges, the side edges of each of said holes in said platform being selectively receivable within the notches of any of said pairs of notches of one of said shanks whereby the forward edge of said platform is releasably supported optionally at selected elevation upon said hangers, said platform extending aft from said hangers far enough for its after portion to rest upon said back seat when said forward edge is supported upon said hangers.

7. A platform structure for an automobile having front and back seats, comprising a plurality of hangers, each of said hangers comprising a hook portion engageable with the back of said front seat and a shank extending downward therefrom aft of said seat back, a laterally extensible platform comprising a plurality of sections and means slidably interconnecting said sections in telescopic relation to each other, means for releasably supporting the forward edge of said platform on said shanks optionally at any of a plurality of elevations, said platform extending aft from said hangers far enough for its after portion to rest upon said back seat when said forward edge is secured to said shanks at a predetermined one of several optional elevations, and means for supporting said after portion of said platform with said after portion elevated above said back seat.

8. A platform structure for an automobile having front and back seats, comprising a plurality of hangers, each of said hangers comprising a hook portion releasably engageable with the back of said front seat and a shank extending downward therefrom aft of said back seat, and a laterally extensible platform comprising a plurality of sections and means slidably interconnecting said sections in telescopic relation to each other, said sections having a plurality of holes therethrough adjacent the forward edges thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having opposed notches in its lateral edges adapted to receive the side edges of one of said holes and thereby releasably support the forward edge of said platform.

9. A platform structure for an automobile having front and back seats, comprising a plurality of hangers, each of said hangers comprising a hook portion releasably engageable with the back of said front seat and a shank extending downward therefrom aft of said seat back, a laterally extensible platform comprising a plurality of sections and means slidably interconnecting said sections in telescopic relation to each other, said sections having a plurality of holes therethrough adjacent the forward edges thereof, each of said holes being elongated in a direction extending at predetermined angularity with respect to edges of said platform and said shanks comprising strips wider than the width of said holes and narrower than the length of said holes, each of said strips being disposed substantially transversely with respect to said holes when said hook portion associated therewith is engaged upon said seat back and each of said strips having a plurality of pairs of opposed notches in its lateral edges, the side edges of each of said holes in said platform being selectively receivable within the notches of any of said pairs of notches of one of said shanks whereby the forward edge of said platform is releasably supported optionally at selected elevation upon said hangers, and means for releasably supporting the after edge of said platform with said platform extending aft from said back of said front seat at selected angularity.

10. A platform structure for an automobile having front and back seats, comprising a plurality of hangers, each of said hangers comprising a hook portion engageable with the back of said front seat and a shank extending downward therefrom aft of said seat back, a laterally extensible platform comprising a plurality of telescopically interengaged sections, means for releasably supporting the forward edge of said platform on said shanks optionally at any of a plurality of elevations, said platform extending aft from said hangers far enough for its after portion to rest upon said back seat when said forward edge is secured to said shanks at a predetermined one of several optional elevations, and means for supporting said after portion of said platform with said after portion elevated above said back seat.

WALTER J. TITLEY.

REFERENCES CITED

The following references are of record in the file of this patent:

UNITED STATES PATENTS

| Number | Name | Date |
| --- | --- | --- |
| 957,324 | Gall | May 10, 1910 |
| 1,429,390 | Williams | Sept. 19, 1922 |
| 1,487,475 | Ribyat | Mar. 18, 1924 |